(12) United States Patent
Finkelstein

(10) Patent No.: US 9,054,888 B2
(45) Date of Patent: Jun. 9, 2015

(54) SYSTEMS AND METHODS FOR PROVIDING BROADBAND COMMUNICATION

(75) Inventor: Jeffrey L. Finkelstein, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/109,529

(22) Filed: May 17, 2011

(65) Prior Publication Data

US 2011/0280574 A1  Nov. 17, 2011

Related U.S. Application Data

(60) Provisional application No. 61/345,245, filed on May 17, 2010.

(51) Int. Cl.
  *H04J 14/00* (2006.01)
  *H04N 7/16* (2011.01)
  *H04L 12/28* (2006.01)
  *H04L 12/10* (2006.01)

(52) U.S. Cl.
  CPC ............ *H04L 12/2801* (2013.01); *H04L 12/10* (2013.01); *H04L 12/2861* (2013.01); *H04L 12/2885* (2013.01); *H04L 12/2889* (2013.01); *H04L 12/2892* (2013.01); *H04L 12/2896* (2013.01); *H04L 12/2898* (2013.01)

(58) Field of Classification Search
  USPC ............. 398/43–106, 160, 115–116; 455/5.1; 370/392, 276; 725/105–134
  See application file for complete search history.

(56) References Cited

U.S. PATENT DOCUMENTS

| | | | | |
|---|---|---|---|---|
| 3,886,454 A | * | 5/1975 | Oakley et al. | 725/125 |
| 5,408,259 A | * | 4/1995 | Warwick | 725/149 |
| 5,425,027 A | * | 6/1995 | Baran | 370/395.6 |
| 5,528,582 A | * | 6/1996 | Bodeep et al. | 370/276 |
| 5,581,555 A | * | 12/1996 | Dubberly et al. | 370/487 |
| 5,768,682 A | * | 6/1998 | Peyrovian | 725/104 |
| 5,774,458 A | * | 6/1998 | Williamson | 370/276 |
| 5,791,197 A | * | 8/1998 | Rempinski et al. | 74/473.18 |
| 5,822,677 A | * | 10/1998 | Peyrovian | 725/126 |
| 5,864,748 A | * | 1/1999 | Dail | 725/126 |

(Continued)

OTHER PUBLICATIONS

Non-Final Office Action for U.S. Appl. No. 12/833,157 dated Sep. 12, 2012.

*Primary Examiner* — Ken Vanderpuye
*Assistant Examiner* — Dibson Sanchez
(74) *Attorney, Agent, or Firm* — Sutherland Asbill & Brennan LLP

(57) ABSTRACT

Systems and methods for providing broadband communication are provided. A source component may be configured to provide a downstream broadband signal to one or more customer devices and receive upstream signals from the customer devices, including a first upstream signal having a frequency lower than the downstream broadband signal and a second upstream signal having a frequency higher than the downstream broadband signal. An optical fiber node in communication with the source component may be configured to receive and convert downstream and upstream broadband signals from radio frequency signals to light signals and vice versa. A terminator in communication with the optical fiber node via one or more cable lines may be configured to output the radio frequency downstream signal for receipt by the customer devices and to direct the communication of the upstream signals to the optical fiber node via the one or more cable lines.

18 Claims, 4 Drawing Sheets

(56) References Cited

U.S. PATENT DOCUMENTS

| | | | |
|---|---|---|---|
| 5,889,765 A * | 3/1999 | Gibbs | 370/310.2 |
| 5,963,844 A * | 10/1999 | Dail | 725/125 |
| 6,348,837 B1 * | 2/2002 | Ibelings | 330/126 |
| 6,580,723 B1 * | 6/2003 | Chapman | 370/442 |
| 6,948,000 B2 | 9/2005 | Desai et al. | 709/245 |
| 7,412,169 B2 * | 8/2008 | Joo et al. | 398/72 |
| 7,450,859 B2 * | 11/2008 | Joo et al. | 398/168 |
| 7,620,325 B2 * | 11/2009 | Mizutani et al. | 398/100 |
| 7,748,023 B2 * | 6/2010 | Weinstein et al. | 725/127 |
| 8,286,209 B2 * | 10/2012 | Egan et al. | 725/74 |
| 8,493,986 B2 | 7/2013 | Shrum, Jr. | |
| 8,528,034 B2 * | 9/2013 | Urban et al. | 725/111 |
| 8,787,759 B2 * | 7/2014 | Shiba et al. | 398/67 |
| 2002/0171895 A1 | 11/2002 | Chang | |
| 2002/0174435 A1 * | 11/2002 | Weinstein et al. | 725/80 |
| 2004/0103442 A1 * | 5/2004 | Eng | 725/126 |
| 2004/0109689 A1 * | 6/2004 | Song et al. | 398/69 |
| 2004/0264683 A1 * | 12/2004 | Bye | 379/402 |
| 2004/0264961 A1 | 12/2004 | Nam et al. | |
| 2005/0047783 A1 * | 3/2005 | Sisto et al. | 398/71 |
| 2005/0069317 A1 * | 3/2005 | Lee et al. | 398/67 |
| 2005/0114903 A1 * | 5/2005 | Ahmed et al. | 725/114 |
| 2005/0203647 A1 | 9/2005 | Landry et al. | |
| 2006/0053462 A1 * | 3/2006 | Albag et al. | 725/126 |
| 2006/0067691 A1 | 3/2006 | Hirano et al. | |
| 2006/0133810 A1 * | 6/2006 | Inbar et al. | 398/70 |
| 2006/0222365 A1 * | 10/2006 | Jung et al. | 398/72 |
| 2007/0019957 A1 * | 1/2007 | Kim et al. | 398/72 |
| 2007/0061854 A1 * | 3/2007 | Albag et al. | 725/95 |
| 2007/0092256 A1 * | 4/2007 | Nozue et al. | 398/72 |
| 2007/0122151 A1 * | 5/2007 | Watanabe | 398/69 |
| 2007/0250891 A1 * | 10/2007 | Weinstein et al. | 725/127 |
| 2008/0159744 A1 | 7/2008 | Soto et al. | |
| 2008/0166127 A1 * | 7/2008 | Kazawa et al. | 398/79 |
| 2008/0219670 A1 * | 9/2008 | Kim et al. | 398/115 |
| 2008/0279554 A1 * | 11/2008 | Kazawa et al. | 398/69 |
| 2009/0041460 A1 | 2/2009 | Bernard et al. | |
| 2009/0060530 A1 | 3/2009 | Biegert et al. | |
| 2009/0070477 A1 | 3/2009 | Baum et al. | |
| 2009/0119735 A1 * | 5/2009 | Dounaevski et al. | 725/129 |
| 2009/0161682 A1 | 6/2009 | Johnson et al. | |
| 2009/0165070 A1 * | 6/2009 | McMullin et al. | 725/125 |
| 2009/0180782 A1 * | 7/2009 | Bernard et al. | 398/140 |
| 2009/0247006 A1 | 10/2009 | Thompson | |
| 2009/0291660 A1 * | 11/2009 | Trachewsky | 455/296 |
| 2010/0083330 A1 * | 4/2010 | Bernstein et al. | 725/111 |
| 2010/0118753 A1 | 5/2010 | Mandin et al. | |
| 2010/0146564 A1 * | 6/2010 | Halik et al. | 725/78 |
| 2010/0150557 A1 * | 6/2010 | Mysore et al. | 398/68 |
| 2010/0154016 A1 | 6/2010 | Li et al. | |
| 2010/0239255 A1 * | 9/2010 | Ikeda et al. | 398/66 |
| 2010/0246582 A1 * | 9/2010 | Salinger et al. | 370/392 |
| 2010/0319046 A1 * | 12/2010 | Albag et al. | 725/131 |
| 2010/0322085 A1 | 12/2010 | Kalbag | |
| 2011/0001833 A1 | 1/2011 | Grinkemeyer et al. | |
| 2011/0096762 A1 | 4/2011 | Basart | |
| 2011/0107379 A1 | 5/2011 | Lajoie et al. | |
| 2012/0110631 A1 * | 5/2012 | Rakib | 725/127 |
| 2012/0198510 A1 * | 8/2012 | Stoneback et al. | 725/129 |
| 2012/0204216 A1 | 8/2012 | Connelly et al. | |

* cited by examiner

SYSTEMS AND METHODS FOR PROVIDING BROADBAND COMMUNICATION

CROSS-REFERENCE TO RELATED APPLICATION

The present application claims benefit of U.S. Provisional Application No. 61/345,245, filed May 17, 2010, and entitled "Systems and Methods for Providing Broadband Communication," the disclosure of which is incorporated by reference herein in its entirety.

FIELD OF THE INVENTION

Aspects of the invention relate generally to broadband communication, and more particularly, to systems and methods that facilitate the provision of broadband communication.

BACKGROUND OF THE INVENTION

Cable service providers and other broadband service providers provide a wide variety of services to any number of customers or households. Examples of services that are provided include television service, telephone service, and Internet service. Typically, a cable service provider utilizes an infrastructure of fiber optic and radio frequency cables in order to communicate broadband signals to various customers and receive commands and other communications from the customers.

Within conventional cable infrastructures, a first frequency band is typically utilized for a forward data path or downstream data path and a second frequency band is typically utilized for a return data path or upstream data path. For example, a frequency band between eighty-eight (88) megahertz (MHz) and one (1) gigahertz (GHz) can be utilized to forward broadband communications from a cable plant to one or more households, and a frequency band between five (5) and eighty-five (88) MHz can be utilized to receive return signals from the one or more households. However, with increasing services being offered by cable providers and increasing bandwidth demands by customers, the existing return path likely will not have a sufficient data capacity to communicate return signals in a timely manner. In order to increase capacity, cable providers are typically required to install or add additional fiber nodes that are capable of providing service to their customers. Such installation often includes significant equipment costs.

Therefore, improved systems, methods, apparatus, and devices that facilitate the provision of broadband communication are desirable. Additionally, improved systems, methods, apparatus, and devices that provide increased return signal capability are desirable.

BRIEF DESCRIPTION OF THE INVENTION

Some or all of the above needs and/or problems may be addressed by certain embodiments of the invention. Embodiments of the invention may include systems and methods for providing broadband communication. In one embodiment, a system that facilitates the provision of broadband communication is provided. The system may include a source component, an optical fiber node, and a terminator. The source component may be configured to provide a downstream broadband signal to one or more customer devices and receive upstream signals from the one or more customer devices. The upstream signals may include a first signal having a frequency lower than the downstream broadband signal and a second signal having a frequency higher than the downstream broadband signal. The optical fiber node may be in communication with the source component via at least one optical fiber, and the optical fiber node may be configured (i) to receive the downstream broadband signal via the at least one optical fiber, (ii) convert the downstream broadband signal into a radio frequency downstream signal, (iii) output the downstream broadband signal onto one or more cable lines for communication to the one or more customer devices, (iv) receive the upstream signals via the one or more cable lines, and (v) convert the received upstream signals into light signals for communication to the source component via the at least one optical fiber. The terminator may be in communication with the optical fiber node via the one or more cable lines, and the terminator may be configured to output the radio frequency downstream signal for receipt by the one or more customer devices and direct the communication of the upstream signals to the optical fiber node via the one or more cable lines.

In accordance with another embodiment of the invention, a method for providing broadband communication is provided. A downstream broadband signal may be output by a source component for communication to a plurality of customer devices. Additionally, a first upstream signal having a frequency lower than the downstream signal may be received by the source component from a first customer device included in the plurality of customer devices. Additionally, a second upstream signal having a frequency higher than the downstream broadband signal may be received by the source component from a second customer device included in the plurality of customer devices.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1:
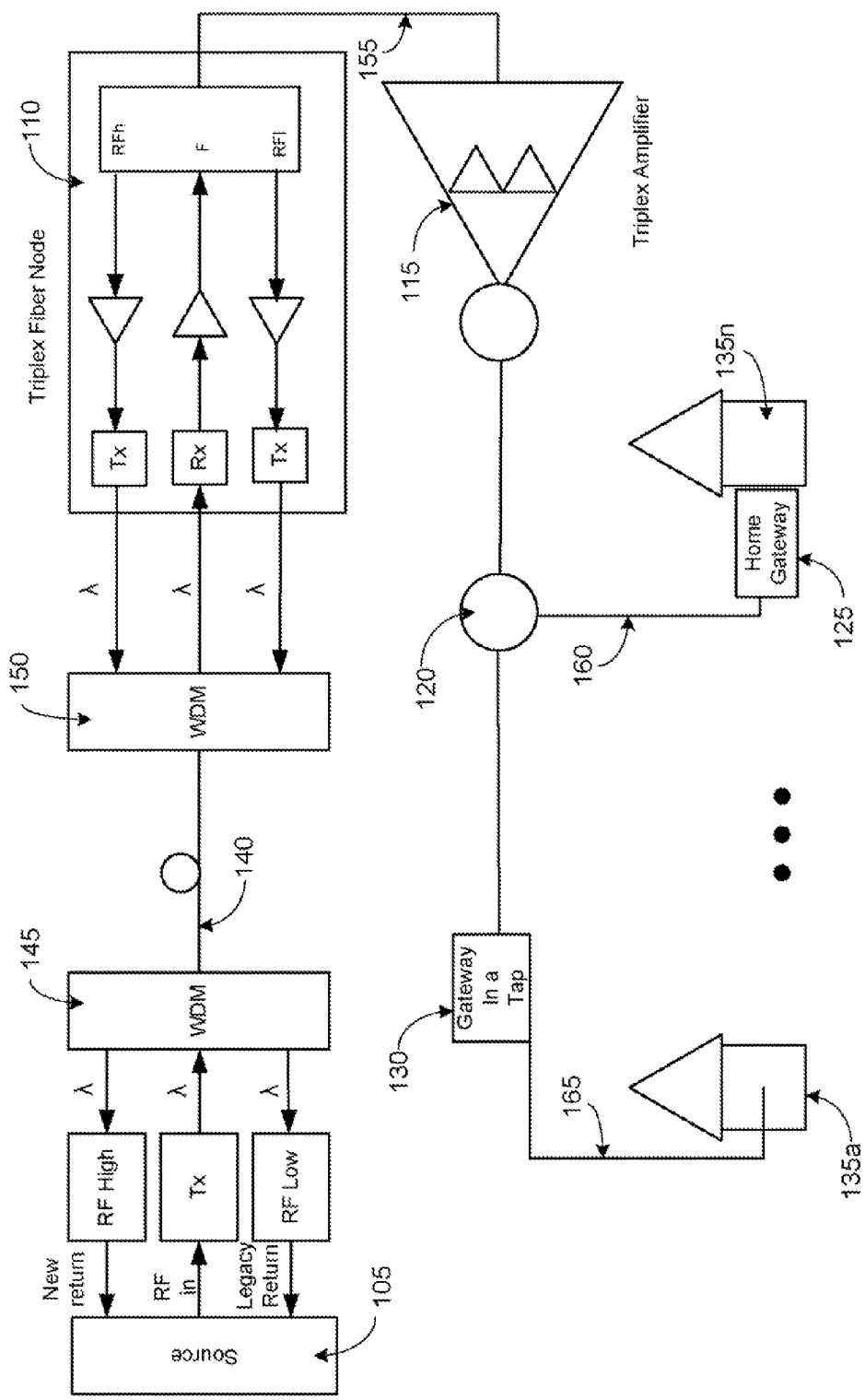
FIG. 1 illustrates a block diagram of an example system for providing broadband communication, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, apparatus, and devices for providing broadband communication. In certain embodiments, a cable infrastructure may be provided. The cable infrastructure may include a return signal data capacity that is relatively greater than that of conventional cable infrastructures. According to one example embodiment, a cable infrastructure may be provided that includes one or more additional return paths that facilitate the upstream communication of data from one or more households to a cable plant or cable source. According to an aspect of the invention, the additional return paths may have frequency bands or frequency ranges that are greater than those of conventional return paths and conventional forward paths. As one example, one or more additional return path signals having a frequency range within approximately 1.1 GHz and approximately 1.8 GHz may be utilized. Any number of return path signals may be provided that have a frequency range greater than that of the conventional forward path. In this regard, the cable infrastructure may include a relatively greater upstream data capacity than conventional cable infrastructures.

For purposes of this disclosure, the term "household" refers to any residential unit or business establishment that may be provided with broadband communication service, including but not limited to, houses, apartment units, condominium units, small businesses, etc.

I. Structural Overview

A first example system 100 or infrastructure for providing broadband communication will now be described illustratively with respect to FIG. 1. The system 100 may include a source 105, one or more fiber nodes 110, one or more amplifiers 115, one or more terminators 120 or taps, and one or more gateway devices 125, 130. The source 105 may be configured to output broadband communications for delivery to one or more of the gateway devices 125, 130. Additionally, a gateway device 125, 130 may be configured to output commands and/or other signals for communication to the source 105. According to an aspect of the invention, signals or communications that are output by a gateway device 125, 130 may be communicated to the source 105 utilizing at least one of two separate return paths or return bands. In this regard, relatively greater upstream data capacity may be provided by the system 100.

With reference to FIG. 1, the source 105 may be a suitable source of broadband content, such as a cable plant. The source 105 may be configured to generate and/or combine any number of data streams and/or data components into a broadband signal that is output by the source 105 for receipt by one or more households. For example, the source 105 may be configured to obtain video data streams from one or more content providers, such as television networks, premium content providers, and/or other content providers, and the source 105 may be configured to generate a broadband signal based at least in part on the video data streams. As desired, the source 105 may insert commercials and/or other data into a television or video component of a broadband signal. Additionally, the source 105 may be configured to generate or obtain any number of data components that are inserted or added to a broadband signal, such as television guide data, an Internet data signal, home security data signals, Voice over Internet Protocol ("VoIP") telephone signals, etc. Any number of modulation techniques and/or data standards may be utilized by a source 105 in the generation or compilation of a broadband data signal. For example, television data may be modulated utilizing a suitable Quadrature Amplitude Modulation ("QAM") or other modulation technique, and the modulated data may be incorporated into the broadband data signal. As another example, an orthogonal frequency-division multiple access ("OFDMA") technique, a time division multiple access ("TDMA") technique, an advanced time division multiple access ("ATDMA") technique, a synchronous code division multiple access ("SCDMA") technique, or another suitable modulation technique or scheme may be utilized to modulate data included within the broadband data signal. The broadband data signal may be configured to provide a wide variety of services to one or more households, including but not limited to, television service, telephone service, Internet service, home monitoring service, security service, etc.

Once a broadband data signal has been generated by a source 105, the source 105 may output the broadband data signal for communication to and receipt by one or more households, such as households 135*a-n*. In certain embodiments of the invention, the broadband data signal may be generated as a radio frequency ("RF") signal in which the data components will be communicated to the households 135*a-n* utilizing a forward or downstream path. As desired, the forward path may include signal components having a frequency within a given forward path frequency range or frequency band. A wide variety of frequency ranges may be utilized as desired for the forward path, such as a frequency range from approximately eighty-eight (88) MHz to approximately one (1) GHz.

In certain embodiments, the generated broadband signal may be output utilizing one or more fiber optic cables 140 or optical fibers that are configured to carry the broadband signal from the source 105 to one or more corresponding fiber nodes 110. For example, the radio frequency broadband signal may be processed utilizing one or more suitable wavelength-division multiplexing ("WDM") devices 145 or WDM systems, and the processed signal may be provided to or driven onto an optical fiber 140. A wide variety of different types of WDM devices 145 may be utilized as desired in various embodiments of the invention, such as dense WDM devices and add-drop WDM devices. As desired, a WDM device 145 may include a terminal multiplexer component that includes one or more wavelength converting transponders. Each wavelength converting transponder may receive one or more components of the input broadband signal and convert that signal into a light signal using a suitable laser, such as a 1550 nm band laser. The terminal multiplex may also contain an optical multiplexer configured to receive the various 1550 nm band signals and place or drive those signals onto a single optical fiber 140.

As desired, the WDM device 145 may amplify the broadband signals that are processed by the WDM device 145. Additionally or alternatively, one or more line repeaters or other amplifying devices may be positioned along a length of the optical fiber 140 in order to amplify the broadband signal and compensate for any losses in optical power.

In addition to processing downstream or forward path signals that are received from the source 105, the WDM device 145 may be configured to receive and process upstream signals that are communicated to the source 105 from one or more households 135*a-n*. In order to facilitate the processing of upstream or return path signals, the WDM device 145 may include one or more terminal demultiplexers that are configured to break a received signal back into individual signals that can be converted into radio frequency signals for provision to the source 105. According to an aspect of the invention, the WDM device 145 may include at least one terminal demultiplexer that is configured to process low frequency return path signals and at least one additional terminal demultiplexer that is configured to process high frequency return path signals. As desired, the return path signals that are processed may include a wide variety of different wavelengths. For example, the return path signals may include wavelengths of approximately 1310 nm and/or approximately 1570 nm. In certain embodiments, different wavelengths can be utilized for relatively high frequency return path signals and relatively low frequency return path signals.

The optical fibers 140 may be configured to carry broadband signals between the source 105 and one or more fiber nodes 110. These signals may include forward path signals generated by the source 105 and return path signals generated by one or more households 135*a-n*. For example, the optical fibers 140 may carry signals between a WDM device 145 associated with the source 105 and one or more WDM devices 150 associated with the fiber nodes 110. A wide variety of different optical fibers 140 may be utilized as desired in various embodiments of the invention, such as multi-mode fibers, single-mode fibers, and special purpose fibers. Additionally, the optical fibers 140 may be constructed from a wide variety of different materials, such as silica, fluorides, phosphates, and/or chalcogenides. The optical fibers 140 may be configured to carry signals as light pulses utilizing total internal reflection.

With continued reference to FIG. 1, any number of fiber nodes 110 may be provided. Each fiber node 110 may be configured to receive and process downstream or forward path signals from the source 105. Additionally, each fiber node 110 may be configured to receive and process upstream or return path signals received from the one or more households 135*a-n*. In certain embodiments of the invention, one or more of the fiber nodes 110 may be triplex fiber nodes that are configured to process three signals, including a relatively low frequency return path signal, a forward path signal, and a relatively high frequency return path signal. As desired, a fiber node 110 may filter one or more received signals utilizing physical or hardware filters and/or software-based filters in order to separate forward path and different return path signals for processing. For example, a high pass filter may be utilized to filter out a relatively high frequency return path signal, a band pass filter may be utilized to filter out a forward path signal, and a low pass filter may be utilized to filter out a relatively low frequency return path signal. In certain embodiments, each fiber node 110 may include or be in communication with a suitable WDM device 150. The WDM device 150 associated with the fiber node 110 may be similar to the WDM device 145 associated with the source 105 that is described above. However, the WDM device 150 associated with the fiber node 110 may be configured to receive a forward path signal from an optical fiber 140 as a light signal that can be converted into an RF signal. Additionally, the WDM device 150 may be configured to receive upstream or return path signals as RF signals that can be converted into one or more light signals for communication onto an optical fiber 140. According to an aspect of the invention, the fiber node 110 and WDM device 150 may be configured to receive and process any number of return path signals. For example, both a relatively low frequency return path signal (e.g., a signal having a frequency between approximately 5 MHz and approximately 85 MHz) and one or more relatively high frequency return path signals (e.g., one or more signals falling within a frequency range of approximately 1.1 GHz to approximately 1.8 GHz or higher).

The fiber node 110 may output a received forward path signal onto one or more cable lines 155 as an RF signal. According to certain embodiments of the invention, up to four cable lines 155 may be connected to a fiber node 110; however, as desired, any number of cable lines 155 may be connected to the fiber node 110. Additionally, the fiber node 110 and the WDM device 150 may output a received return path or upstream signal onto the optical fiber 140 for communication to the source 105.

In certain embodiments, the fiber node 110 may be configured to amplify forward path and/or return path signals. For example, the fiber node 110 may include respective amplifiers or amplification components that are configured to amplify or enhance the forward signal, a relatively low frequency return path signal, and a relatively high frequency return path signal.

Each cable line 155 may be configured to communicate broadband signals or broadband communications between a fiber node 110 and one or more terminators 120 or taps that are connected to the cable line 155. A cable line 155 may be configured to communicate both forward path and return path broadband signals. A wide variety of suitable cable lines may be utilized as desired in various embodiments of the invention. For example, various types of coaxial cables and/or other RF cables may be utilized. Additionally, although a single cable line is discussed herein as being provided between a fiber node 110 and any number of terminators 120, it will be appreciated that any number of cable lines may be provided. For example, a first cable line may be provided between a fiber node and an amplifier, a second cable line may be provided between the amplifier and a first terminator, and a third cable line may be provided between the first terminator and a second terminator.

Any number of terminators 120 may be connected to a cable line 155 as desired in various embodiments of the invention. The terminators 120 may form access points from which households may be provided with broadband service. Each time a terminator 120 is connected to a cable line 155 and/or service is provided to a household, the strength of the broadband signal carried by the cable line 155 may be reduced or degraded. Accordingly, in certain embodiments of the invention, one or more amplifiers 115 or amplification devices may be provided that are configured to amplify, enhance, or boost the signals that are propagated through the cable lines 155.

An amplifier 115 may be configured to amplify both forward path or downstream signals and return path or upstream signals. According to an aspect of the invention, one or more of the amplifiers 115 that are utilized may be triplex amplifiers that are configured to process and amplify three signals, including a relatively low frequency return path signal, a forward path signal, and a relatively high frequency return path signal. However, amplifiers that are configured to process more than three signals may be utilized. As desired, an amplifier 115 may filter one or more received signals utilizing any number of suitable physical or hardware filters and/or software-based filters. In this regard, forward path signals and various return path signals may be separated for amplification and other processing. For example, a high pass filter may be utilized to filter out a relatively high frequency return path signal, a band pass filter may be utilized to filter out a forward path signal, and a low pass filter may be utilized to filter out a relatively low frequency return path signal. Once a signal has been filtered out or otherwise isolated by the amplifier 115, the amplifier 115 may amplify the signal. For example, the amplifier 115 may increase the amplitude of the signal. In certain embodiments, the various components of a broadband signal (e.g., low return path, forward path, high return path) may be amplified by respective amplification components of the amplifier 115. Each amplified signal may then be output onto or driven back onto the cable line 155 in a desired direction for the signal. As desired, any number of diodes or other suitable devices may be incorporated into the amplifier 115 in order to prevent or limit undesired leakage of an amplified signal in a direction from which the signal was received. For example, the amplifier 115 may receive a return path signal from a terminator 120 or other amplifier, the amplifier 115 may amplify the signal, and the amplifier may output the signal in an upstream direction towards the fiber node 110 and/or source 105 while limiting the output or leakage of the signal in a downstream direction.

The amplifier 115 may include a wide variety of gains as desired in various embodiments of the invention. Additionally, as desired, different gains may be utilized for different components of a broadband signal. In certain embodiments, the amplifier 115 may be powered by a received broadband signal, such as a received downstream signal. Additionally or alternatively, the amplifier 115 may be powered by one or more batteries and/or external power sources. In certain embodiments, the power requirements of the amplifier 115 may be based at least in part on the modulation technique(s) utilized in association with the broadband signals that are amplified. In one example embodiment, a relatively low power amplifier may be provided in association with an OFDMA modulation technique.

With continued reference to FIG. 1, any number of terminators 120 or taps may be connected to a cable line 155. A terminator 120 may form an access point from which one or more households, such as households 135*a-n*, may be provided with broadband services. Any number of households may be serviced by a terminator 120 as desired in various embodiments of the invention. For example, in certain embodiments, up to four households may be serviced by a terminator 120. As desired, a cable drop 160, 165 or other signal line (e.g., a coaxial cable or RF cable) may extend from the terminator 120 to a household 135*a-n*. In this regard, signals may be provided to and/or received from the household 135*a-n*.

With continued reference to FIG. 1, a suitable gateway device may be configured to provide broadband services to a household. In certain embodiments of the invention, a home gateway device 125 may be provided for a household 135*n*. For example, a cable drop 160 may extend from a terminator 120 to a home gateway device 125, and the home gateway device 125 may provide service to the household 135*n*. As desired, a home gateway device 125 may be positioned within a household or just outside of a household, for example, on an external wall of a household. In other embodiments, a gateway device 130 may be incorporated into or situated at a terminator, and the gateway device 130 may process received broadband signals and provide broadband services to one or more households, such as household 135*a*. In other words, an outside hardened solution may be provided at the terminator 120 for providing any number of broadband services to households. An example of a suitable gateway device that may be incorporated into a terminator 120 is described in greater detail below with reference to FIG. 5.

A gateway device, such as a home gateway device 125 or a gateway device 130 that is included in a terminator, may include one or more components that control the provision of broadband services to one or more households. For example, a gateway device may include a broadband modem and/or a router that are configured to process received broadband signals and provide the signals to one or more households and/or to the source 105. In certain embodiments of the invention, a gateway device may be a triplex gateway device that is configured to process three signals, including a relatively low frequency return path signal, a forward path signal, and a relatively high frequency return path signal. However, gateway devices that are configured to process more than three signals may be utilized. In certain embodiments, a network, such as a local area network or a wide area network, may be formed between a gateway device and one or more devices situated within a household (e.g., set-top boxes, cable modems, routers, network bridging devices, etc.).

One example gateway device may include a face-plate or termination component, a cable device (e.g., a cable modem device or cable bridging device), and/or at least one Ethernet component. The face-plate or termination component may facilitate the termination of cable lines or cable drops that connect household devices to the gateway device and/or that connect the gateway device to a terminator or tap. A face-plate may be configured to pass broadband signals falling within an RF cable spectrum, such as broadband signals having a frequency of up to three (3) GHz. Additionally, the face-plate may include a relatively low loss direct current ("DC") coupler that is configured to pass signals falling within the RF spectrum to the cable device. The cable device may be any suitable cable device that facilitates the filtering and processing of various components of one or more broadband signals, such as a relatively low frequency return path, a forward path, and a relatively high frequency return path. A wide variety of different types of cable devices may be incorporated into a gateway device as desired in various embodiments of the invention, such as broadband modems, multi-channel broadband modems, routers, and/or bridging devices. In certain embodiments, the cable device may be a suitable Digital Over Cable Service Interface Specification ("DOCSIS") device (e.g., modem) that operates utilizing a DOCSIS telecommunications standard. The Ethernet component may include an Ethernet switching subsystem that connects an Ethernet output of a DOCSIS device to a switch fabric of a tap and/or an Ethernet bridge or other suitable Ethernet connection that translates Ethernet signals into signals that may be transmitted into a household. For example, the Ethernet component may include an Ethernet connection that is configured to connect to a Multimedia over Coax Alliance ("MoCA") bridge or interface, although other interfaces and/or standards may be utilized. Utilizing MoCA interfaces, one or more MoCA signals may be output by the gateway device for communication to one or more households. A MoCA signal may be a signal that is allowed to be communicated to a household; however, the MoCA signal may be filtered by the Ethernet component and/or other components of the gateway device (e.g., any number of suitable MoCA filters or point of entry ("POE") filters, etc.) in order to prevent leakage of the MoCA signal upstream to the source. In this regard, any home networks formed between the gateway device and one or more household routers may be isolated from the source.

The system 100 illustrated in FIG. 1 may provide one or more return paths or upstream paths having a frequency greater than that of a forward or downstream path. Accordingly, the various components of the system 100 may be configured to process at least one additional return path. In this regard, additional upstream data capacity and bandwidth may be provided to customers of a cable service provider.

Figure 2:
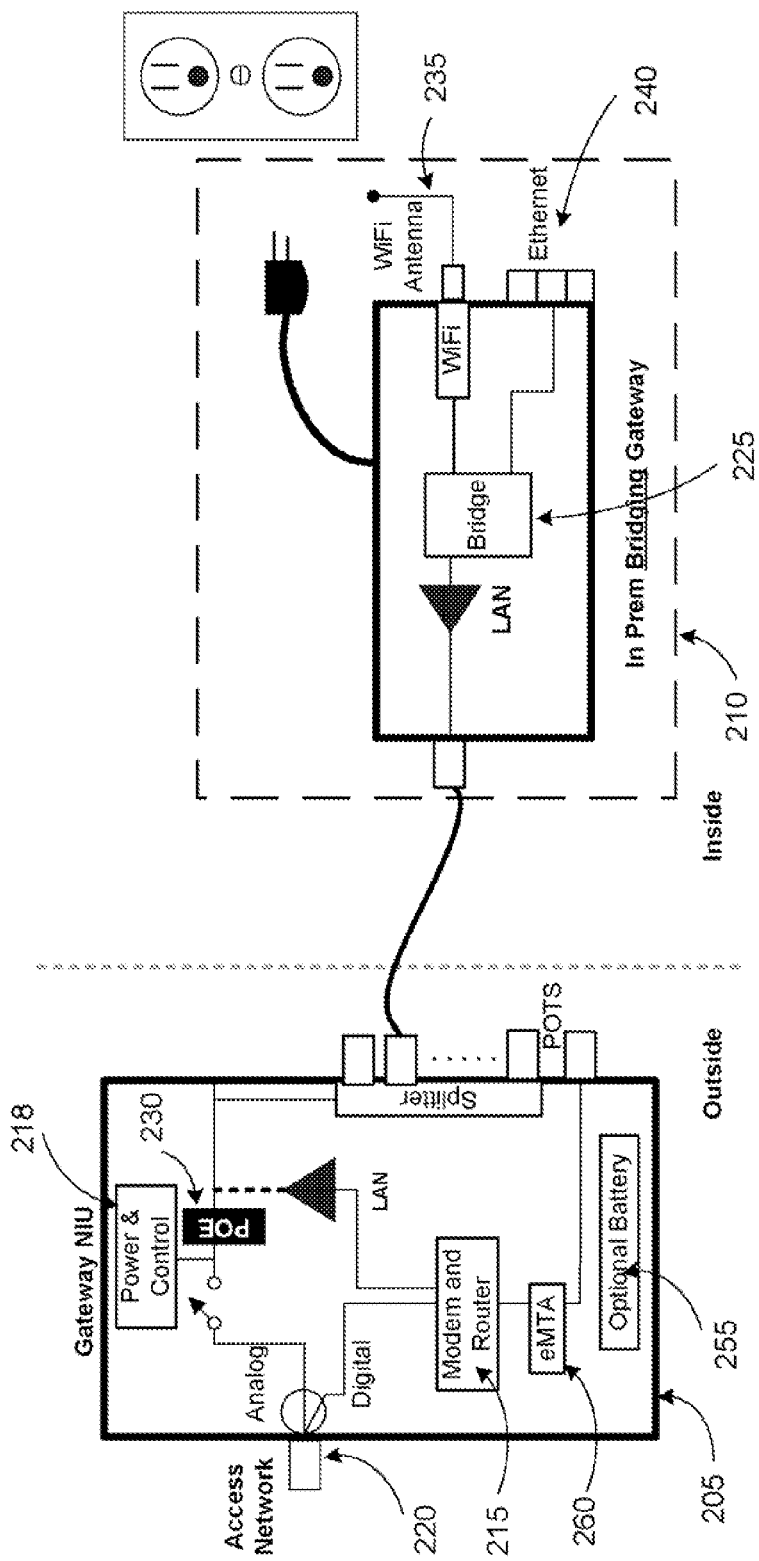
FIG. 2 illustrates a block diagram of an example triplex gateway device that may be utilized in accordance with various embodiments of the invention.

FIG. 2 illustrates a block diagram of an example triplex gateway device 205 that may be utilized in accordance with various embodiments of the invention. The gateway device 205 of FIG. 2 may be a gateway device that is incorporated into a terminator or tap, such as the terminator 120 illustrated in FIG. 1. Alternatively, the gateway device 205 may be a gateway device that is situated external to a tap. The gateway device 205 may be a triplex gateway device that is configured to provide broadband signals to a household 210 and/or to receive broadband signals and/or data commands from the household 210.

As illustrated in FIG. 2, the gateway device 205 may include a modem/router 215 and a termination component 220. The termination component 220 may be configured to connect to a source of a broadband data signal and receive the signal from the source. For example, the termination component 220 may be configured to connect to a feeder of a broadband data signal, such as a feeder line provided by a cable company. In certain embodiments, the gateway device 205 may be situated at and/or within a cable junction box or tap, and a cable line or feeder may connect to the termination component 220 at the junction box. In other embodiments, a cable drop may be provided between a tap and the gateway device 205. A wide variety of suitable termination components 220 may be utilized as desired in various embodiments of the invention, such as a radio frequency ("RF") termination component or an RF coaxial termination component.

Once a forward path or downstream broadband data signal is received by the termination component 220, the termination component may provide at least a portion of the received signal to the modem/router 215. For example, one or more components of the broadband data signal that carry modulated digital data may be provided to the modem 215. As explained in greater detail below, in certain embodiments, one or more analog components of the signal and/or unencrypted digital components of the signal (e.g., clear quadrature amplitude modulation ("QAM") components) may be provided from the termination component 220 to one or more ports for provision to the household 210. When an upstream or return path signal is received by the termination component 220, the termination component 220 may provide and/or drive the upstream signal onto a feeder or cable line for communication to a source, such as the source 105 illustrated in FIG. 1.

In certain embodiments of the invention, the termination component 220 may receive a power signal from a cable drop or cable line. For example, a power signal may be received via a coaxial cable connected to the gateway device 205. As desired, the received power signal may be provided by the termination component 220 to one or more other components of the gateway device 205, such as the modem/router 215. In this regard, components of the gateway device 205 may be powered by the source of the broadband data signal. Alternatively, the gateway device 205 may be powered via a power bridge connected to a household. For example, the service gateway 205 may be powered via a power bridge connected to a power outlet or other power source at a household.

The modem/router 215 may be a combination device or two separate devices that are incorporated into or included in the gateway device 205. The modem/router 215 may be configured to receive a broadband data signal and provide at least a portion of the received broadband data signal to the household 210. As desired, the modem/router 215 may include one or more processing devices that may be configured for processing a received broadband signal and providing at least a portion of the broadband signal to the household 210. In this regard, the services provided to the household 210 may be controlled. Additionally, the processing devices may be utilized to control the general operations of the gateway device 205 and/or facilitate control of one or more of the other components of the gateway device 205. Additionally or alternatively, additional processing devices and/or control units, such as a controller 218 may be included. A processing device or processing component (e.g., the modem/router 215, controller 218, etc.) may be configured to access and read associated computer-readable media having stored thereon data and/or computer-executable instructions for providing broadband services to the household. The gateway device 205 of FIG. 2 is described as providing service to a single household 210; however, the functionality of the gateway device 205 may be extended in order to provide service to multiple households.

The modem/router 215 may include a suitable broadband modem component and/or a suitable router component. The modem component may be any suitable device that is configured to receive at least a portion of a broadband data signal from the termination component 220 and demodulate the received signal. Additionally, the modem may be configured to selectively output the broadband data signal and/or portions of the broadband data signal for receipt by one or more households, such as household 210. As desired, the modem component may be capable of providing a wide variety of services to a household, such as television service, Internet service, Voice over Internet Protocol ("VoIP") telephone service, home monitoring services, etc. In certain embodiments, the modem component may divide and/or filter the received signal-into one or more frequency bands associated with different services. Additionally, as desired, the modem component may selectively decrypt the received signal.

A wide variety of different types of broadband modem components or modems may be utilized as desired in various embodiments of the invention, including but not limited to, cable modems, passive optical network ("PON") modems, and the like. In certain embodiments, the modem component may be a DOCSIS modem that operates utilizing a DOCSIS telecommunications standard. Additionally, as desired, the modem component may be a multi-channel modem that is capable of providing a signal to multiple households. The modem component may include any number of channels as desired in various embodiments, such as four channels, eight channels, etc. Additionally, each of the households and/or devices situated within the household (e.g., bridging devices, set-top boxes, etc.) may be individually addressable by the modem component. In this regard, the modem component may selectively provide portions of the broadband signal to one or more households.

Additionally, in certain embodiments, the modem component or another processing device associated with the gateway device 205 may control the provision of signals that are not processed by the modem component, such as analog signals, clear QAM signals, etc., to one or more households. For example, the modem component may control the positioning and/or actuation of one or more switches that facilitate the communication of an analog signal from the termination component 220 to one or more ports. In this regard, if a household 210 is not authorized to receive an analog signal, then the modem component may prevent the signal from being provided to the household 210. Accordingly, services (e.g., analog services, clear QAM services, digital services, etc.) may be selectively activated and deactivated for the household. In certain embodiments, control signals and/or configuration files may be uploaded or otherwise communicated to the modem component from the source 105, and the modem component may utilize the received information to selectively control the provision of services.

If a router component is provided, the router component may receive the broadband data signal (or a portion thereof) from the modem component, and the router component may output the broadband data signal for receipt by one or more remote devices situated within one or more households. The router component may be a specialized computer or computing component that facilitates the receipt of information from the modem component and the forwarding of received information to one or more households. Additionally, the router component may facilitate the receipt of upstream signals from one or more households and the provision of an upstream signal to the modem for communication to the source 105. A wide variety of suitable routers may be utilized as desired in various embodiments of the invention. Additionally, as desired, the router component may be a multi-channel router that facilitates communication with multiple households. The router component may include any number of channels as desired in various embodiments, such as four channels, eight channels, etc. In certain embodiments, the router component may be a router that includes one or more MoCA interfaces, although other interfaces and/or standards may be utilized. Utilizing MoCA interfaces, one or more MoCA signals may be output by the router component for communication to one or more households. A MoCA signal may be a signal that is allowed to be communicated to a household 210; however, the MoCA signal may be filtered by the router component and/or any number of suitable MoCA filters or point of entry ("POE") filters 230 in order to prevent leakage of the MoCA signal onto a cable feeder and/or to the source. In this regard, a home network formed between the router component and a household 210 may be isolated from the source.

As desired, the router component may include a wireless output component. For example, the router component may form a wireless access point that facilitates access to broadband communication via any number of wireless devices or Wi-Fi devices. In certain embodiments, devices that are permitted to access certain portions of the broadband signal, such as mobile devices and/or computers associated with a household 210, may be configured to receive a wireless signal from the router component.

In operation, the router component may output a signal for receipt by a household 210 via a local area network ("LAN") that is formed between the router and the household 210. In embodiments in which multiple households are serviced, a separate LAN may be provided for each respective household. Each LAN may be associated with a corresponding port that facilitates output of a broadband signal from the router component to the respective household. The ports may additionally facilitate the communication of analog components, clear QAM components, and/or other components of the broadband signal to the households. Additionally, as desired, certain ports may not be connected to a household, thereby leaving a household without service and/or providing resources to expand the services provided by the gateway device 205. Moreover, in certain embodiments, the gateway device 205 may provide conventional or legacy services to any number of households. For example, legacy services that bypass the functionality of the modem/router 215 (e.g., television service, etc.) may be provided to one or more households.

According to an aspect of the invention, the modem component and/or the router component may be configured to process forward path signals and multiple return path or upstream signals, such as a relatively low frequency return signal and at least one relatively high frequency return signal. The modem and/or router components may be configured to filter received signals in order to identify the type of signal that is received. Alternatively, separate filters may be utilized prior to a signal being provided to a modem and/or router. Once a signal has been received, the modem and/or router may identify a destination of the signal (e.g., a source, a household device, etc.) and direct the output of the signal to an identified destination.

Any number of suitable household devices may be in communication with the modem/router 215 of the gateway device 205. As shown in FIG. 2, a network bridging device 225 situated within the household 210, such as a Wi-Fi bridging device or other suitable bridging device, may be configured to receive a broadband signal from the service gateway 205. The network bridging device 225 may receive a broadband signal and provide the signal to one or more other household devices, such as a set-top box, personal computer, security system, etc. Additionally, the network bridging device 225 may receive commands and or upstream signals from the one or more household devices and provide the upstream signals to the modem/router 215. As desired, the network bridging device 225 may include or be in communication with a suitable transceiver component or wireless output component, such as a WiFi antenna 235. Additionally, as desired, the network bridging device 225 may be configured to provide a portion of the broadband signal to any number of Ethernet devices 240 or other suitable devices in communication with the network bridging device 225.

With continued reference to FIG. 2, any number of batteries 255 may be incorporated into the gateway device 205. The batteries 255 may be utilized to provide power to one or more components of the gateway device 205 in the event of a loss of power or low power event. In certain embodiments, the batteries 255 may be charged by a suitable power source prior to the detection of a loss of power event and/or following the end of a loss of power event.

With continued reference to FIG. 2, the gateway device 205 may include an embedded Multimedia Terminator Adaptor ("eMTA") 260 in certain embodiments of the invention. An eMTA 260 may be provided in order to extend the functionality of the modern component to provide telephone service to one or more households. As desired, the eMTA 260 may be a multi-line eMTA. The eMTA 260 may facilitate the provision of VoIP telephony to one or more households. VoIP services may be provided to the households via the respective LANs and/or via any number of suitable plain old telephone service ("POTS") ports and/or connections between the gateway device and the households.

A wide variety of other types of gateway devices may be utilized as desired in various embodiments of the invention. For example, a multi-dwelling unit ("MDU") gateway device may be configured for use at an apartment complex or another multi-dwelling unit. An MDU device may include a gateway device that includes a suitable multi-band modem and, as desired, a suitable multi-tenant router.

Operational Overview

Figure 3:
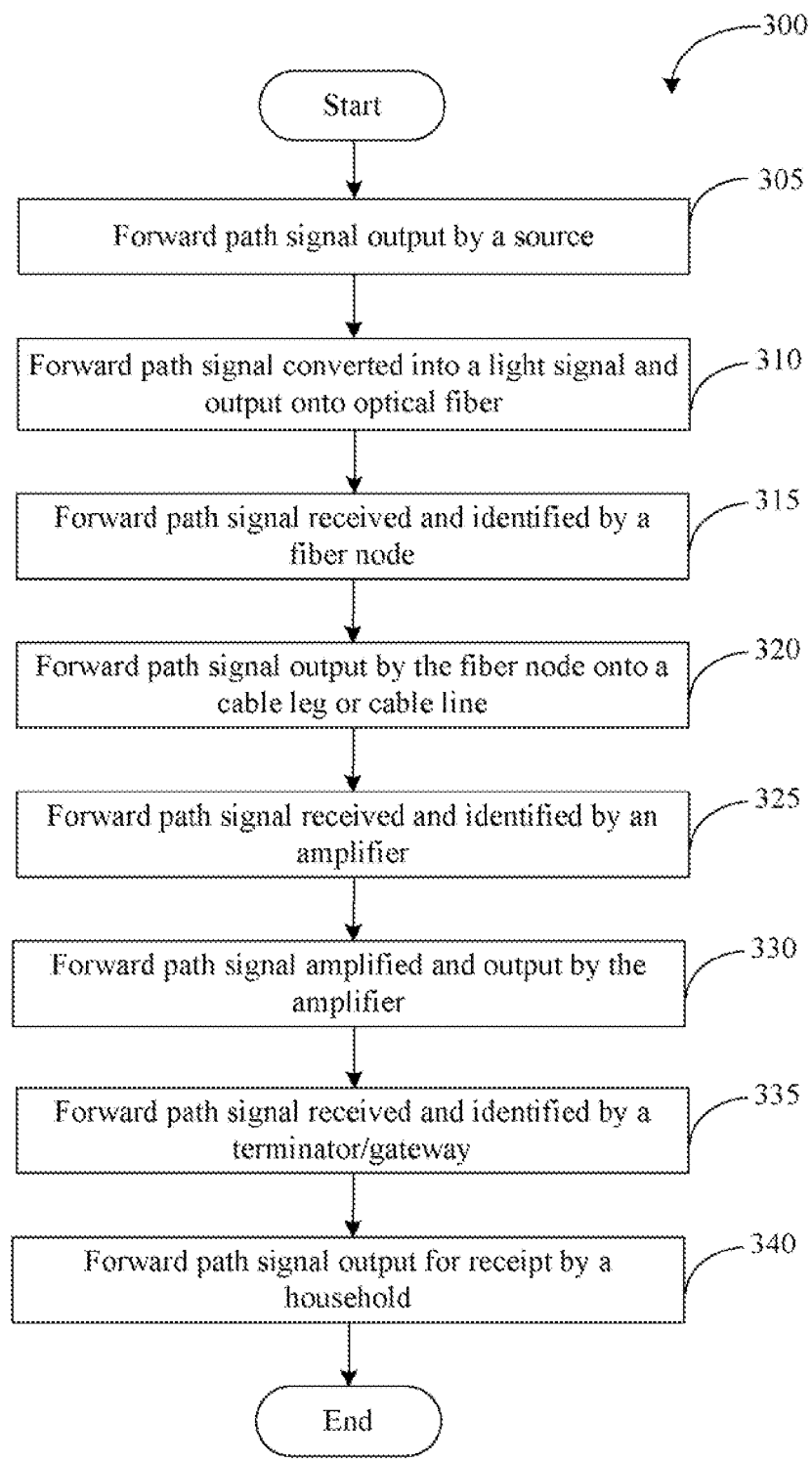
FIG. 3 is a flow diagram of an example method for providing a broadband communication to a household, according to an illustrative embodiment of the invention.

FIG. 3 is a flow diagram of an example method 300 for providing a broadband communication to a household, according to an illustrative embodiment of the invention. The method 300 illustrated in FIG. 3 is a method for providing a forward path or downstream signal to a household utilizing a suitable cable infrastructure or cable system, such as the system 100 illustrated in FIG. 1.

The method 300 may begin at block 305. At block 305, a forward path signal may be generated and output by a suitable signal source, such as the source 105 illustrated in FIG. 1. The forward path signal may be a broadband signal including any number of data components, such as television components, telephone components, etc. At block 310, the forward path signal may be converted into a light signal that may be output onto an optical fiber for transmission, such as the optical fiber 140 illustrated in FIG. 1. As desired, a suitable WDM system, such as the WDM system 145 shown in FIG. 1, may be utilized to process the forward path signal and output the forward path signal onto the optical fiber 140. The WDM system 145 may be a system that is capable of processing at least three different types of signals, including the forward path signal, a relatively low frequency return signal, and a relatively high frequency return signal.

The forward path signal may be communicated by the optical fiber 140 to a fiber node, such as the triplex fiber node 110 illustrated in FIG. 1. The fiber node 110 may receive the forward path signal at block 315, and the fiber node 110 may identify the forward path signal. For example, one or more filters associated with the fiber node 110, such as a band-pass filter, may be utilized to identify the forward path signal. The fiber node 110 may then convert the forward path signal into an RF signal and output the RF signal onto one or more cable legs or cable lines at block 320. For example, the forward path signal may be output by the fiber node 110 onto a cable line that is similar to the cable line 155 illustrated in FIG. 1. As desired, the fiber node 110 may amplify the forward path signal prior to outputting the forward path signal.

The cable line 155 may communicate the forward path signal to any number of terminators or taps, such as the terminator 120 illustrated in FIG. 1. At block 325, an amplifier positioned between the fiber node 110 and the terminator 120, such as the triplex amplifier 115 illustrated in FIG. 1, may receive and identify the forward path signal. For example, one or more filters associated with the amplifier 115, such as a band-pass filter, may be utilized to identify the forward path signal. Once the forward path signal has been identified and/or isolated, the amplifier 115 may amplify the forward path signal and output the forward path signal for downstream communication on the cable line 155 at block 330.

At block 335, the forward path signal may be received and identified by the terminator 120. For example, one or more filters associated with the terminator 120 may be utilized to identify and/or isolate the forward path signal. As desired, the terminator 120 may optionally amplify the forward path signal and output the forward path signal for downstream communication to one or more other terminators and/or amplifiers. Additionally, at block 340, the terminator 120 and/or a gateway device associated with the terminator 120 may output the signal for receipt by at least one household. In certain embodiments, the forward path signal may be output by the terminator 120 for receipt by a home or household gateway device. In other embodiments, a gateway device may be incorporated into the terminator 120, and the gateway device may receive the forward path signal and output at least a portion of the forward path signal for receipt by one or more household devices.

The method 300 may end following block 340.

Figure 4:
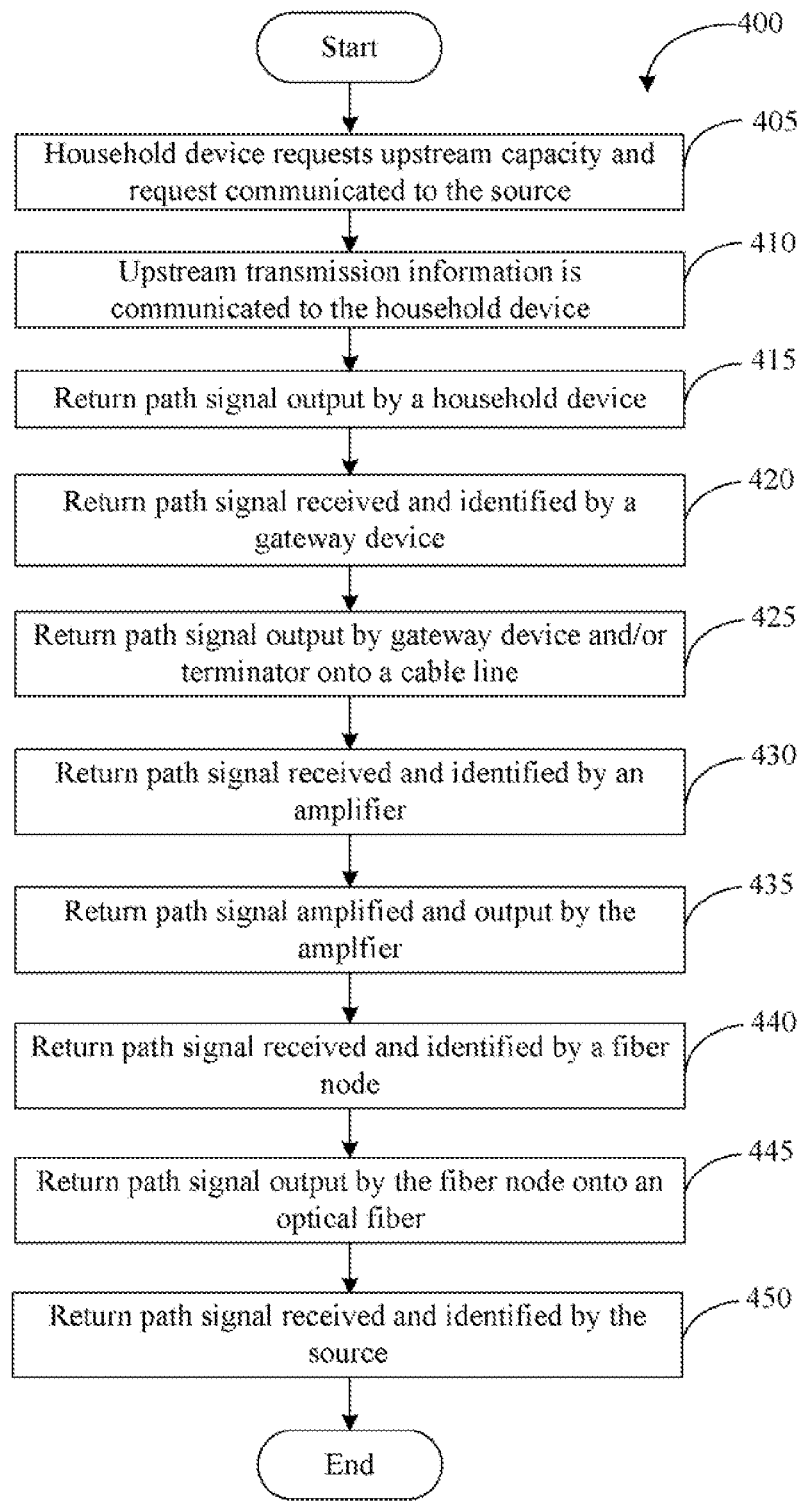
FIG. 4 is a flow diagram of an example method for receiving a broadband communication from a household, according to an illustrative embodiment of the invention.

FIG. 4 is a flow diagram of an example method 400 for receiving a broadband communication from a household, according to an illustrative embodiment of the invention. The method 400 illustrated in FIG. 4 is a method for providing a return path or upstream signal to a household utilizing a suitable cable infrastructure or cable system, such as the system 100 illustrated in FIG. 1.

The method 400 may begin at block 405. At block 405, a household device (e.g., a set-top box, personal computer, modem, etc.) may request permission to communicate a return path or upstream signal to a source, such as the source 105 illustrated in FIG. 1. The request may indicate that an upstream communication is available and, as desired, a size or data capacity of the upstream communication. In certain embodiments, a certain amount of upstream capacity may be requested. The request may be communicated to the source 105 utilizing at least one return path. A wide variety of techniques or methods may be utilized to communicate the request to the source, such as the method described below with reference to blocks 415-450.

At block 410, the request may be received by the source 105, and the source 105 may communicate upstream transmission information to the household device that made the request. The upstream transmission information may specify the parameters under which the upstream communication will be output by the household device for communication to the source, including but not limited to, times or time periods in which upstream communications should be output, sizes or data amounts to be included in upstream communications, and/or frequencies and/or return path channels on which the upstream communications should be output. According to an aspect of the invention, the upstream transmission information may specify whether an upstream communication should be output by a household device on a relatively low frequency return path (e.g., a return path having a frequency between approximately 5 MHz and approximately 85 MHz) and/or on one or more relatively high frequency return paths (e.g., a return path having a frequency between approximately 1.1 GHz and approximately 1.8 GHz or higher). In certain embodiments, the upstream transmission information may be communicated to the household device using a suitable forward path or downstream path. For example, the upstream transmission information may be communicated to the household device in accordance with the method 300 described above with reference to FIG. 3.

At block 415, the upstream transmission information may be received by a household device, and an upstream or return path signal may be generated and/or formatted by the household device in accordance with the upstream transmission information. The return path signal may then be output by the household device for communication to the source 105.

At block 420, the return path signal may be received and identified by a suitable gateway device and/or terminator, such as the gateway devices 125, 130 and/or the terminator 120 illustrated in FIG. 1. The gateway device or terminator may identify the return path signal utilizing any number of suitable physical, hardware, and/or software filters. For example, a relatively low frequency return path signal that is output on a conventional return path may be identified utilizing one or more low pass filters. As another example, a relatively high frequency return path signal that is output on a return path having a frequency that is greater than the forward path may be identified utilizing one or more suitable high pass filters. Once the return path signal has been identified, the gateway device and/or terminator may output the return path signal at block 425 for upstream communication to the source 105. For example, the return path signal may be output onto or driven onto a suitable cable line, such as the cable line 155 illustrated in FIG. 1. As desired, the return path signal may be amplified prior to output.

At block 430, the return path signal may be received and identified by an amplifier, such as the triplex amplifier 115 illustrated in FIG. 1, that is connected to the cable line 155 and positioned between the gateway device/terminator and an upstream fiber node, such as the fiber node 110 illustrated in FIG. 1. The return path signal may be identified and/or isolated utilizing any number of suitable filters, such as low pass and/or high pass filters. Once the return path signal has been identified, the triplex amplifier 115 may amplify the return path signal and output the return path signal at block 435 for upstream communication.

At block 440, the return path signal may be received and identified by the fiber node 110. For example, the fiber node 110 may filter received signals to identify the return path or upstream signal utilizing filtering techniques that are similar to those described above. At block 445, the fiber node 110 and/or an associated WDM system may convert the received RF upstream signal into a light signal that may be output onto an optical fiber, such as the optical fiber 140 illustrated in FIG. 1. For example, one or more lasers may be utilized to output the signal onto an optical fiber 140. As desired, any number of wavelengths may be utilized to generate the upstream signal that is output onto the fiber 140. Additionally, in certain embodiments, different wavelength may be utilized for the return path signal depending on whether the signal is a relatively high frequency signal or a relatively low frequency signal.

At block 450, the return path signal may be received and identified by the source 105. For example, the return path signal may be received by a WDM system associated with the source, and the return path signal may be converted into an RF signal. The return path signal may be filtered out or isolated either prior to the conversion into an RF signal or following the conversion. The return path signal may then be processed by the source 105 as desired in various embodiments of the invention.

The method 400 may end following block 450.

The operations described and shown in the methods 300, 400 of FIGS. 3 and 4 may be carried out or performed in any suitable order as desired in various embodiments of the invention. Furthermore, in certain embodiments, less than or more than the operations described in FIGS. 3 and 4 may be performed.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A broadband communication system comprising:
a source component that provides a downstream broadband signal to one or more customer devices and receives upstream signals carrying upstream communications from the one or more customer devices, wherein the upstream signals comprise a first signal having a lower frequency than a frequency of the downstream broadband signal and a second signal having a higher frequency than the frequency the downstream broadband signal, wherein the source component is configured to:
receive, from a customer device of the one or more customer devices, a request to send an upstream communication;
generate, based at least in part on the request, upstream information comprising (i) an identification of the lower frequency over which a first data amount of the upstream communication is to be received from the customer device, and (ii) an identification of the higher frequency over which a second data amount of the upstream communication is to be received from the customer device; and
send the generated upstream information to the customer device, wherein the upstream information causes the customer device to send the upstream communication according to the upstream information;
an optical fiber node comprising a wavelength-division multiplexing device in communication with the source component via at least one optical fiber, the wavelength-division multiplexing device comprising one or more wavelength converting transponders configured (i) to receive the downstream broadband signal via the at least one optical fiber, (ii) convert the downstream broadband signal into a radio frequency downstream signal, (iii) output the downstream broadband signal onto one or more cable lines for communication to the one or more customer devices, (iv) receive the upstream signals via the one or more cable lines, and (v) convert the received upstream signals into light signals for communication to the source component via the at least one optical fiber;
a terminator in communication with the optical fiber node via the one or more cable lines, the terminator configured to (i) output the radio frequency downstream signal for receipt by the one or more customer devices, wherein the radio frequency downstream signal comprises a single channel Multimedia over Coax Alliance (MoCA) signal or a multi-channel MoCA signal, and (ii) direct the communication of the upstream signals to the optical fiber node via the one or more cable lines; and
a filter that reduces feedback of the single channel MoCA signal or the multi-channel MoCA signal through the termination component.

2. The broadband communication system of claim 1, wherein the downstream broadband signal comprises a signal having one or more downstream components that each have a frequency between approximately eighty-eight megahertz and approximately one gigahertz,
wherein the first upstream signal comprises a signal having one or more relatively low frequency components each having a frequency between approximately five megahertz and approximately eighty-eight megahertz, and
wherein the second upstream signal comprises a signal having one or more relatively high frequency components each having a frequency of greater than approximately one gigahertz.

3. The broadband communication system of claim 1, wherein the source component comprises a cable head-end component associated with a cable service provider.

4. The broadband communication system of claim 1, wherein the wavelength-division multiplexing device comprises a first wavelength-division multiplexing device, the broadband communication system further comprising a second wavelength-division multiplexing device, wherein the second wavelength-division multiplexing device is configured to (i) convert radio frequency downstream signals into light signals output onto the at least one optical fiber and (ii) convert received upstream signals into radio frequency signals.

5. The broadband communication system of claim 1, wherein the optical fiber node further comprises a filtering component configured to isolate the upstream signals received from the one or more cable lines and provide the upstream signals to the multiplexing device.

6. The broadband communication system of claim 1, further comprising:
an amplifier connected to at least one of the one or more cable lines between the optical fiber node and the terminator, the amplifier configured to amplify the downstream signal and the upstream signals.

7. The broadband communication system of claim 6, wherein the amplifier comprises:
a first termination component configured to receive the downstream signal;
a second termination component configured to receive the upstream signals;
a filtering component configured to isolate the downstream signal and the upstream signals; and respective amplification components configured to respectively amplify the downstream signal and each of the upstream signals.

8. The broadband communication system of claim 1, further comprising a gateway device, the gateway device comprising:
a broadband modem configured to (i) receive the radio frequency downstream signal from the terminator, (ii) identify, for each of the one or more customer devices, at least a portion of the downstream signal to provide to the customer device, and (iii) direct, for each of the one or more customer devices, the output of the at least a portion of the downstream signal.

9. The broadband communication system of claim 8, wherein the gateway device further comprises a router in communication with the broadband modem, the router configured to output, to each of the one or more customer devices via a respective local area network, the at least a portion of the downstream signal.

10. The broadband communication system of claim 8, wherein the gateway device is incorporated into the terminator.

11. The broadband communication system of claim 1, wherein the upstream information further includes a time parameter associated with the receipt of the upstream communication from the customer device.

12. A method for providing broadband communication, the method comprising:
converting, by one or more wavelength converting transponders of a wavelength-division multiplexing device associated with an optical fiber node in communication with a source component, a downstream broadband signal into a radio frequency downstream signal for outputting onto one or more cables lines for communication to a plurality of customer devices;
outputting, by the one or more wavelength converting transponders, the radio frequency downstream signal onto the one or more cable lines;
outputting, by a termination component to a service gateway that is situated outside of a household comprising the plurality of customer devices, the radio frequency downstream signal for receipt by at least one customer device of the plurality of customer devices, wherein outputting the radio frequency downstream signal for receipt by the at least one customer device comprises outputting a Multimedia over Coax Alliance (MoCA) signal;
reducing a leakage of the MoCA signal through the termination component;
receiving, by the source component from a customer device of the plurality of customer devices, a request to send an upstream communication;
generating, by the source component based at least in part on the request, upstream information comprising (i) an identification of a lower frequency than a frequency of the radio frequency downstream signal, wherein a first data amount of the upstream communication is to be received from the at least one customer device over the lower frequency, and (ii) an identification of a higher frequency than the frequency of the radio frequency downstream signal, wherein a second data amount of the upstream communication is to be received from the at least one customer device over the higher frequency;
sending, by the source component, the generated upstream information to the at least one customer device, wherein the upstream information causes the at least one customer device to send the upstream communication according to the upstream information; and
receiving, by the one or more wavelength converting transponders from the at least one customer device, a first upstream signal carrying the first data amount of the upstream communication, and a second upstream signal carrying the second data amount of the upstream communication, wherein the first upstream signal is received over the lower frequency and the second upstream signal is received over the higher frequency.

13. The method of claim 12, wherein:
outputting a downstream broadband signal comprises outputting a downstream broadband signal having one or more downstream components that each have a frequency between approximately eighty-eight megahertz and approximately one gigahertz;
receiving the first upstream signal comprises receiving a first upstream signal having one or more relatively low frequency components each having a frequency between approximately five megahertz and approximately eighty-eight megahertz; and
receiving the second upstream signal comprises receiving a second upstream signal having one or more relatively high frequency components each having a frequency of greater than approximately one gigahertz.

14. The method of claim 12, further comprising:
receiving, by the one or more wavelength converting transponders, the downstream broadband signal;
receiving, by the one or more wavelength converting transponders from the one or more cable lines, the first upstream signal and the second upstream signal; and
converting, by the optical fiber node, the first and second upstream signals into light signals for communication to the source component via at least one optical fiber.

15. The method of claim 14, further comprising:
isolating, by the optical fiber node via a filtering component, the upstream signals received from the one or more cable lines.

16. The method of claim 12, further comprising:
receiving, by an amplifier situated between the source provider and the plurality of customer devices, the downstream broadband signal and at least one of the first upstream signal or the second upstream signal;
amplifying, by the amplifier, the downstream broadband signal and the received first upstream signal and second upstream signal; and
outputting, by the amplifier, the amplified signals.

17. The method of claim 16, further comprising:
isolating, by the amplifier prior to the amplification, the downstream broadband signal and the received first upstream signal and second upstream signal.

18. The method of claim 12, wherein the upstream information further comprises a time parameter associated with the receipt of the upstream communication from the at least one customer device.

* * * * *